United States Patent [19]

Omarini

[11] Patent Number: 5,404,798
[45] Date of Patent: Apr. 11, 1995

[54] APPARATUS FOR COOKING FOODS

[76] Inventor: Ivo Omarini, Via Provinciale, 42, I-55036 Pieve Fosciana Pontecosi Lucca, Italy

[21] Appl. No.: 158,932

[22] Filed: Nov. 24, 1993

[30] Foreign Application Priority Data

Nov. 27, 1992 [IT] Italy .................... B092A0421

[51] Int. Cl.$^6$ .............................................. A47J 37/04
[52] U.S. Cl. ........................................ 99/395; 99/386; 99/400; 99/421 V
[58] Field of Search ................. 99/393, 386, 395, 396, 99/400, 421 R, 421 H, 421 V, 423, 424, 425

[56] References Cited

U.S. PATENT DOCUMENTS

| | | | |
|---|---|---|---|
| 2,265,421 | 12/1941 | Donnelly | 99/423 |
| 2,920,177 | 1/1960 | Brane | 99/423 |
| 3,277,813 | 10/1966 | Lüscher | 99/393 |
| 3,503,323 | 3/1970 | Swetlitz | 99/393 |
| 3,604,338 | 9/1971 | Fiedler | 99/393 |
| 3,956,979 | 5/1976 | Coroneos | 99/421 V |
| 4,063,497 | 12/1977 | Thompson | 99/423 |
| 4,704,956 | 11/1987 | Gill | 99/427 |

FOREIGN PATENT DOCUMENTS 2179242 3/1987 United Kingdom.

*Primary Examiner*—David A. Scherbel
*Assistant Examiner*—Reginald L. Alexander
*Attorney, Agent, or Firm*—Fay, Sharpe, Beall, Fagan, Minnich & McKee

[57] ABSTRACT

An apparatus for roasting foods comprises a chamber (1) provided with a vertical opening (2), a heat source (3), located internally of the chamber (1), a support (4) rotatable about a vertical axis (Z) adjacent to the opening (2) which support (4) rotates at a variable height with respect to a base plane of the apparatus, and which support (4) cooperates with a drip-pan (5) equipped with a grill (6) arranged internally of the drip-pan (5) and in a raised position from a bottom of the apparatus. (FIG. 1)

11 Claims, 2 Drawing Sheets

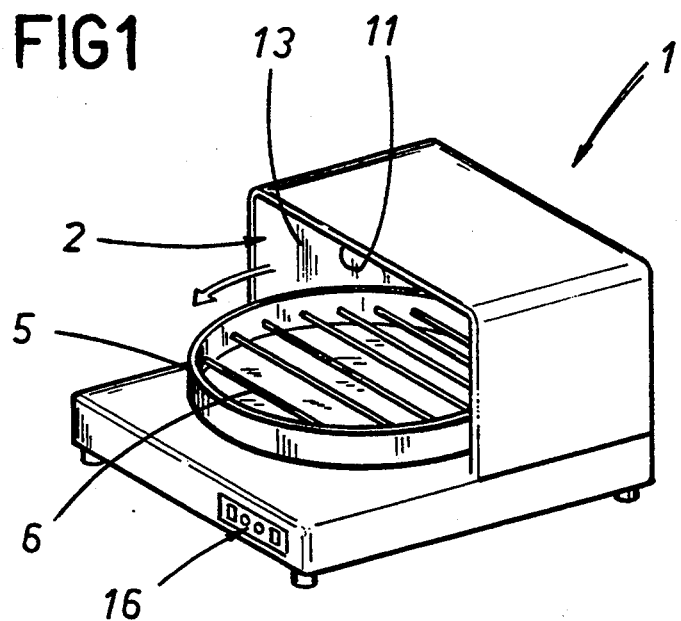
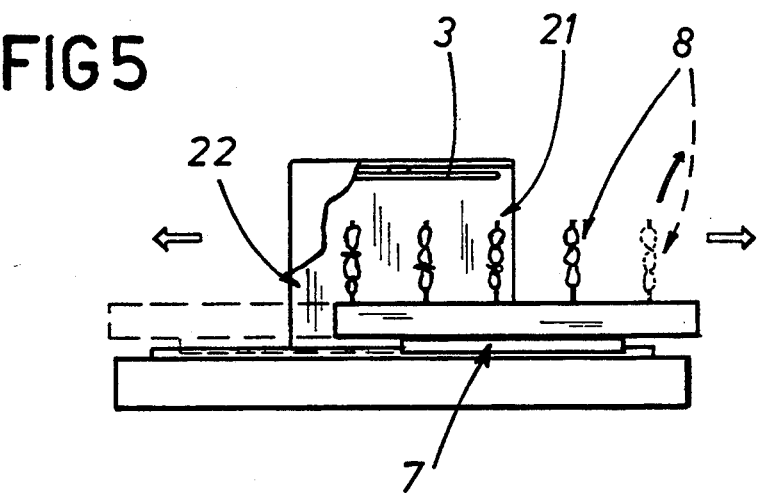
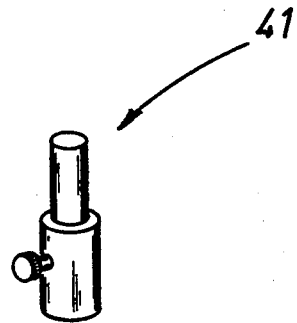

APPARATUS FOR COOKING FOODS

BACKGROUND OF THE INVENTION

The invention relates to an apparatus for cooking foods, in particular for roasting meats or fish. Roasting is a generally popular way of cooking meat and fish since food cooked in this way does not lose its nutritional and tasty juices. The crust created by heat action is also a favourite.

Among the most common traditional roasting methods, such as split-roasting, grilling and oven-roasting, the last is certainly the most used in a normal kitchen, for obvious reasons of practicality, especially because of the limited mass of the oven and the lower level of expulsion of fumes into the atmosphere.

Roasting in normal domestic ovens calls for considerable attention in order that the food does not overcook. Although ovens are provided with a thermostat and a transparent door, roasting well is still the work of an expert.

Other drawbacks can derive from the fact that the oven is constituted by a closed chamber. The internal temperature of the oven can reach very high values which, apart from spoiling the food, can lead to a premature separation of fats from the muscular tissue, with a loss of taste in the cooked food. Fats, liquefied from the heat action, develop fumes which can give an unpleasantly bitter taste to the food and furthermore, as they fry they spit against the oven sides, creating the need for regular and laborious cleaning. Further still, the water vapour formed inside the oven from the chemical processes connected with cooking accumulate inside the oven and alter the cooking itself.

Known ovens generally have a spit, which is in fact little used by most since the closed configuration of the oven makes the spit difficult to use efficiently. Also, the drip-tray for the collection of the liquefied fats, which is to be found in most ovens, is not completely efficient as the water poured into it to mix with the fats and stop them from burning up and creating smoke tends, due to the extreme heat in the oven, to evaporate.

The principal aim of the present invention is to obviate the above-mentioned drawbacks.

SUMMARY OF THE INVENTION

The invention, as it is characterised in the claims that follow, resolves the problem of providing an apparatus for cooking foods, in particular for the roasting of meats and fish, wherein the cooking stage can be directly controlled and wherein the liquefied fats do not burn.

The advantage obtained through the present invention consists essentially in the fact that:
excessive food subjection to heat is avoided;
a premature separation of fats from the muscular tissue of the meat is also avoided, conserving the meat's taste;
the fats, liquefied because of the heat action, do not develop into fumes and thus the food does not acquire a bitter taste;
fat is not spat around and against the internal oven walls, which thus have no need of frequent cleaning;
there is no accumulation of water vapour internally of the apparatus;
the apparatus is extremely simple to use and enables even inexpert cooks to roast meat and other foods exceedingly well.

BRIEF DESCRIPTION OF THE DRAWINGS

Further characteristics and advantages of the present invention will better emerge from the detailed description that follows, of an embodiment of the invention, herein illustrated purely in the form of a non-limiting example in the accompanying figures, in which:

FIG. 1 shows a schematic perspective view of a first embodiment of the invention;

FIG. 5 is a lateral view of an apparatus according to a further embodiment;

FIG. 6 is a schematic illustration of the sustaining pivot of the rotating plate.

DESCRIPTION OF THE PREFERRED EMBODIMENTS

Figure 2:
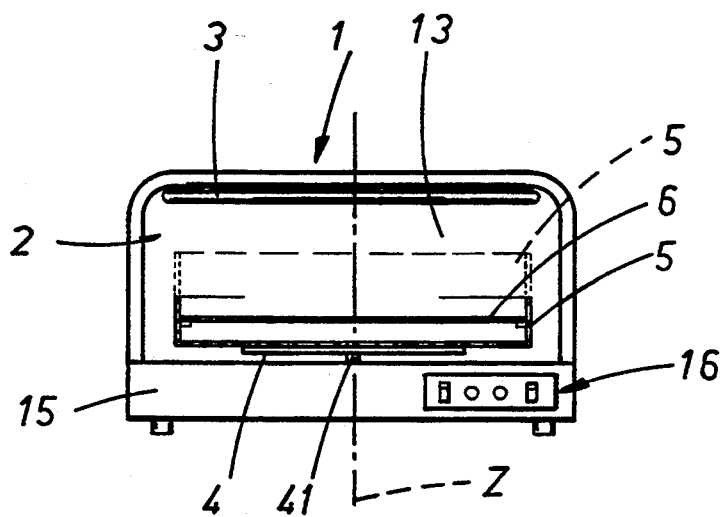
FIGS. 2, 3 and 4 show respectively a front view, a plan view from above and a side view of the invention of FIG. 1.
Figure 3:
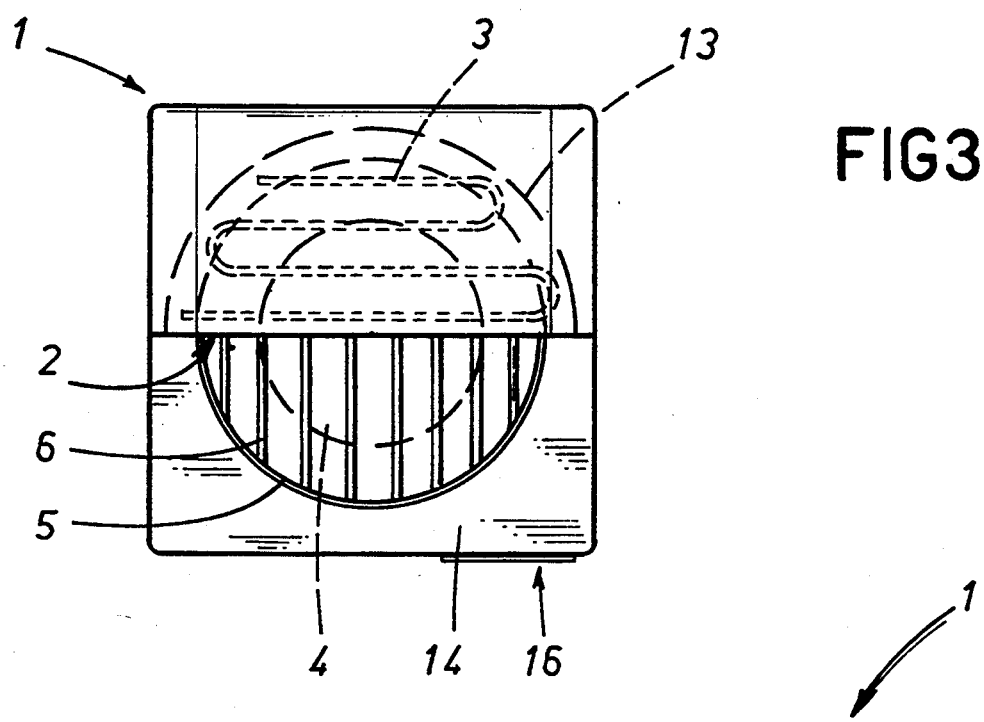
Figure 4:
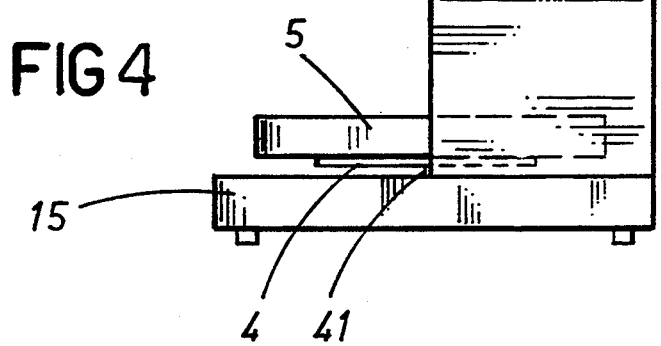

With reference to FIGS. from 1 to 4 and FIG. 6, an apparatus for roasting meat or fish is constituted principally by a chamber 1, parallelepiped in shape and closed except on one face, which is provided with a vertical opening 2.

Internally of the chamber 1 and adjacent to a superior surface 11 and in a central position with respect to the superior surface 11 is located an adjustable heat source of the type having an electrical resistance 3—as illustrated in the figures—or infrared rays or a gas burner. The heat source can be indirect, for example one or two radiating plates heated by a flame.

The internal superior surface 11 is advantageously provided with a reflecting cover—not illustrated in the figures—by means of which the heat radiated by the source is concentrated in the central part of the chamber 1. To the same end the internal lateral surface 13 of the apparatus is advantageously made of reflective material, for example stainless steel, and is semi-cylindrical in shape.

In the inferior part of the chamber 1 a plate 4 is rotatably located about a vertical axis Z adjacent to the opening 2 plane and centrally arranged with respect to the opening 2. The rotary movement—continuous or intermittent—is impressed on the plate by an electric motor situated below the inferior plane 14.

Above the plate 4 is a drip-pan 5 advantageously provided with a grill 6 movably placed internally of the drip-pan 5 and in a raised position with regard to the bottom of the drip-pan 5. A holed metal plate could be used instead of the drip-pan 5, depending on the type of food to be cooked.

As shown in FIG. 6, the sustaining pivot 41 of the plate 4 is advantageously constituted by a telescopic rod so as the food to be cooked can be neared to and distanced from the heat source, in the part of its movement within the apparatus.

The command group 16 of the functioning organs is situated in the frontal part of the base 15, which functioning organs are constituted of, for example: a heat source—pilot light connecting switch; a thermostat regulator handle, an adjustable clock, a switch for the rotating plate 4 motor, with the relative pilot switch, a rotation speed adjustment handle. The relative circuits are housed in the base of the apparatus, which base can be frontally extended, as illustrated, with respect to the opening 2 plane.

The apparatus functions as follows. The meat or fish is placed on the grill 6 inside the drip-pan 5, the drip-pan 5 being moved by the plate 4.

Owing to the rotary motion of the drip-pan 5 and the special position of the rotation axis Z, the meat or fish periodically enters and exits from the chamber 1, wherein due to the electrical resistance 3 there is a great concentration of heat. Thus cooking takes place gradually and the stage of cooking can easily be seen, so that adjustments can swiftly be made when necessary, for example by varying the temperature with the thermostat, changing the position of the meat or fish, or applying condiments and dressings.

Further, the liquefied fats drip into the bottom of the drip-pan 5, below the grill 6, where there is a pool of water that prevents the formation of fumes and which, thanks to the fact that there is constant movement into and out of the chamber 1, evaporates slowly and can be topped up regularly by the operator. Thus the apparatus keeps itself clean and foods do not take on the bitter burnt taste.

Evidently the invention as it is herein conceived is susceptible to numerous modifications and variations, all entering within the field of the inventive concept.

In particular, the apparatus might not be parallelepiped but, for example, cylindrical, hemispherical, conical or truncoconical, provided with more than one opening, which might be arranged superiorly or inferiorly.

In FIG. 5 an alternative embodiment of the invention is shown, in which the rotatable plate 4 is substituted by a slide 7 having alternated rectilinear motion through two openings 21 and 22, while the drip-pan 5 is substituted by two moveable spits 8.

The dimensions of the apparatus can obviously vary considerably, such that it can be used also in restaurant or hotel kitchens.

Although the apparatus is particularly suitable for roasting meat and fish, it is also very versatile, and can be used also for cooking braised meat, foods cooked in sauces and cakes, not to mention bread, vegetables and cheeses.

What is claimed is:

1. An apparatus for cooking foods, comprising a chamber provided with at least one heat source and at least one opening, a rotatable telescopic vertical rod adjacent the opening at a fixed position, a mobile support means of the food rotatably mounted on said rod below the heat source, which mobile support means are able periodically to near and distance the food to and from the at least one heat source, wherein the opening allows, during a cooking procedure, at least a part of the mobile support means to enter and exit periodically from the chamber.

2. An apparatus as in claim 1, wherein the at least one opening is substantially vertical.

3. An apparatus as in claim 2, wherein the mobile support means of the food rotate about a vertical axis which vertical axis is adjacent to the at least one opening; the mobile support means rotating at a variable height with respect to a base plane of the apparatus.

4. An apparatus for cooking foods, comprising a chamber provided with at least one heat source and with mobile support means of the food, which mobile support means are able periodically to near and distance the food to and from the at least one heat source wherein the chamber is provided with at least one substantially vertical opening to allow, during a cooking procedure, at least a part of the mobile support means to enter and exit periodically from the chamber wherein said mobile support means of the food have an alternating rectilinear movement.

5. An apparatus as in claim 3, wherein the support means of the food comprise a plate destined to cooperate with a direct support of the food, the direct support being separable from the plate.

6. An apparatus as in claim 5, wherein the direct support of the food comprise a drip-pan, which drip-pan catches liquefied fats dripping off the food after the liquefied fats have passed through a grill supporting the food.

7. An apparatus for roasting foods, comprising:
 a chamber, provided with at least one vertical opening;
 at least one heat source located internally of the chamber;
 at least one plate rotatable about a telescoping vertical rod defining an axis adjacent to the at least one vertical opening, at a preferably variable height with respect to a base plane of the apparatus, and destined to cooperate with a support means of the food, separable from the at least one plate;
 a collector for the liquefied fats which fall from the support means of the food.

8. An apparatus as in claim 7, wherein the support means of the food and the collector of the liquefied fats are constituted by a drip-pan provided with a grill, which grill is movably arranged internally of the drip-pan and which is raised with respect to a bottom of the drip-pan.

9. An apparatus as in claim 7, wherein an internal lateral surface of the apparatus is made of heat-reflecting material, such as stainless steel, and is semi-cylindrical in shape.

10. An apparatus as in claim 4, wherein the support means of the food comprise a slide destined to cooperate with a direct support of the food, the direct support being separable form the slide.

11. An apparatus as in claim 10, wherein the support means of the food comprise a drip-pan, which drip-pan catches liquefied fats dripping off the food after the liquefied fats have passed through a grill supporting the food.

* * * * *